US012462632B2

(12) United States Patent
Yamada et al.

(10) Patent No.: US 12,462,632 B2
(45) Date of Patent: Nov. 4, 2025

(54) PAPER SHEET HANDLING APPARATUS

(71) Applicants: FUJITSU FRONTECH LIMITED, Tokyo (JP); FUJITSU FRONTECH SYSTEMS LIMITED, Maebashi (JP)

(72) Inventors: Akira Yamada, Inagi (JP); Tomoyuki Tamahashi, Inagi (JP); Takashi Wada, Inagi (JP); Atsushi Ando, Inagi (JP); Shohei Koizumi, Inagi (JP); Shoichi Deguchi, Inagi (JP); Satoshi Hayashi, Inagi (JP)

(73) Assignees: FUJITSU FRONTECH LIMITED, Tokyo (JP); FUJITSU FRONTECH SYSTEMS LIMITED, Maebashi (JP)

( * ) Notice: Subject to any disclaimer, the term of this patent is extended or adjusted under 35 U.S.C. 154(b) by 661 days.

(21) Appl. No.: 17/820,061

(22) Filed: Aug. 16, 2022

(65) Prior Publication Data

US 2022/0392293 A1 Dec. 8, 2022

Related U.S. Application Data

(63) Continuation of application No. PCT/JP2020/007241, filed on Feb. 21, 2020.

(51) Int. Cl.
*G07D 11/14* (2019.01)
*G07D 11/13* (2019.01)

(52) U.S. Cl.
CPC ............. *G07D 11/14* (2019.01); *G07D 11/13* (2019.01); *G07D 2211/00* (2013.01)

(58) Field of Classification Search
CPC ........ G07D 11/14; G07D 11/40; G07D 11/13; G07D 2211/00
See application file for complete search history.

(56) References Cited

U.S. PATENT DOCUMENTS

2012/0031728 A1* 2/2012 Lee ......................... G07F 19/20 194/342
2017/0294068 A1 10/2017 Akagi et al.

FOREIGN PATENT DOCUMENTS

CN 101872505 A 10/2010
JP 2006053811 A 2/2006
(Continued)

OTHER PUBLICATIONS

Office action issued for corresponding Chinese patent application No. 202080097151.7, dated May 31, 2024.
(Continued)

*Primary Examiner* — Jeffrey A Shapiro
(74) *Attorney, Agent, or Firm* — Greer Burns & Crain Ltd.

(57) ABSTRACT

A paper sheet handling apparatus includes: a first facing section and a second facing section that are disposed to face each other across an insertion/take-out space; a partition section that is disposed between the first and second facing sections so as to be capable of moving in a facing direction in which the first and second facing sections face each other, forms, within the insertion/take-out space, an insertion space between the partition section and the first facing section, and forms, within the insertion/take-out space, a take-out space between the partition section and the second facing section. The partition section includes a movable member provided at a leading end portion of the partition section on an insertion/take-out port side and capable of moving toward each of the first facing section and the second facing section.

1 Claim, 9 Drawing Sheets

(56) References Cited

FOREIGN PATENT DOCUMENTS

| | | |
|---|---|---|
| JP | 2009181372 A | 8/2009 |
| JP | 2010257090 A | 11/2010 |

OTHER PUBLICATIONS

Written Opinion of the ISA issued in PCT/JP2020/007241, dated Mar. 31, 2020.
ISR issued in PCT/JP2020/007241, dated Mar. 31, 2020.
Office action issued in corresponding Japanese patent application No. 2022-501586, dated Dec. 13, 2022.
Office action issued in corresponding Chinese patent application No. CN202080097151.7, dated Oct. 21, 2021.
Search report issued in corresponding European patent application No. EP 20 919 509.8, dated Oct. 20, 2023.

* cited by examiner

PAPER SHEET HANDLING APPARATUS

CROSS-REFERENCE TO RELATED APPLICATION

This application is continuation application of International Application PCT/JP2020/007241 filed on Feb. 21 2020 and designated the U.S., the entire contents of which are incorporated herein by reference.

TECHNICAL FIELD

The present invention relates to a paper sheet handling apparatus.

BACKGROUND ART

An automatic transaction apparatus provided with a banknote press for pressing an upper portion of a banknote inserted through a banknote insertion port has been proposed (see, for example, Japanese Laid-open Patent Publication No. 2009-181372 A).

A banknote insertion/withdrawal apparatus has also been proposed that is provided with a banknote press for pressing banknotes to be withdrawn that have been stored in a storage unit, and a pushing member for pushing lower portions of the banknotes to be withdrawn when the banknote press is separated from the banknotes to be withdrawn (see, for example, Japanese Laid-open Patent Publication No. 2006-53811 A).

SUMMARY OF THE INVENTION

A disclosed paper sheet handling apparatus includes: first and second facing sections that are disposed to face each other across an insertion/take-out space into which a paper sheet is inserted through an insertion/take-out port and from which a paper sheet is taken out through the insertion/take-out port; and a partition section that is disposed between the first and second facing sections so as to be capable of moving in a facing direction in which the first and second facing sections face each other, forms, within the insertion/take-out space, an insertion space between the partition section and the first facing section into which a paper sheet is inserted through the insertion/take-out port, and forms, within the insertion/take-out space, a take-out space between the partition section and the second facing section from which a paper sheet is taken out through the insertion/take-out port, wherein the partition section includes a movable member provided at a leading end portion of the partition section on an insertion/take-out port side and capable of moving toward each of the first facing section and the second facing section.

The object and advantages of the present invention will be realized by the elements set forth in the claims or combinations thereof.

DESCRIPTION OF EMBODIMENTS

In the meantime, an automatic transaction apparatus such as an automated teller machine (ATM) includes a banknote insertion/withdrawal unit for inserting a banknote to be deposited and taking out a banknote to be withdrawn. Such a banknote insertion/withdrawal unit may include a pusher that is movably disposed between a stage and a roof, forms an insertion space between the pusher and the stage, and forms a take-out space between the pusher and the roof.

In the banknote insertion/withdrawal unit, the pusher desirably assumes a tapered shape that becomes thinner toward an insertion/take-out port such that the insertion space and the take-out space become wider toward the insertion/take-out port so as to prevent the inserting of a hand from being interfered with when a banknote is inserted into the insertion space or when a banknote is taken out from the take-out space.

However, disposing the pusher assuming the tapered shape within the insertion/take-out space causes the pusher to have an increased thickness on the inner side of the banknote insertion/withdrawal unit because the pusher assumes the tapered shape. Thus, the insertion amount and the take-out amount of banknotes may decrease, or the insertion/take-out space may be large-sized.

With reference to the drawings, the following describes a paper sheet handling apparatus in accordance with an embodiment of the present invention by taking an automatic transaction apparatus 100 as an example.

Figure 1:
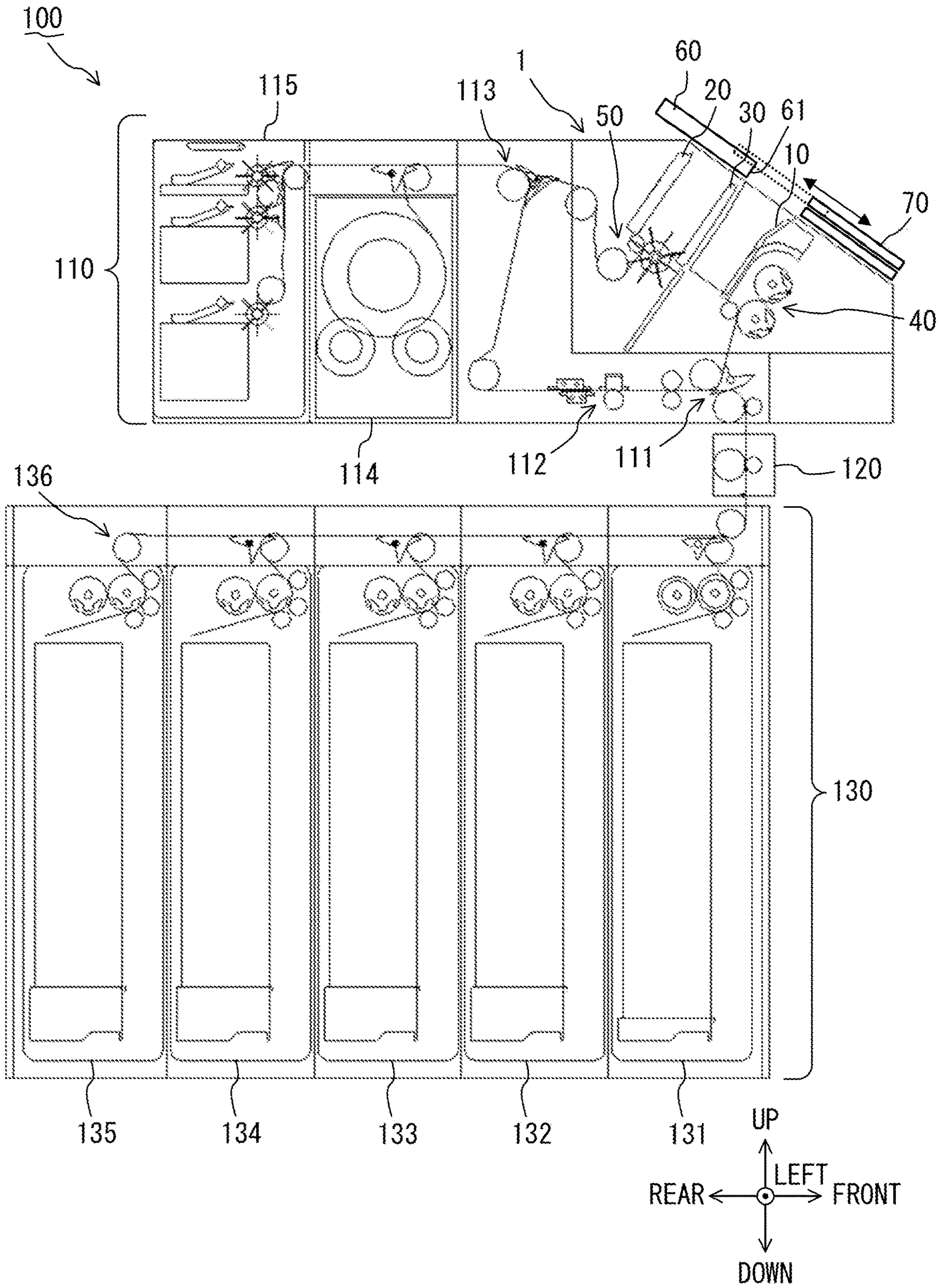
FIG. 1 is a left side view illustrating the internal configuration of an automatic transaction apparatus in an embodiment.

FIG. 1 is a left side view illustrating the internal configuration of the automatic transaction apparatus 100.

The up-down direction, the front-rear direction, and the left-right direction indicated in FIG. 1 and FIGS. 2A-4B (described hereinafter) are merely examples, with the customer side of the automatic transaction apparatus 100 as the front direction. For example, the up-down direction may be a vertical direction, and the front-rear direction and the left-right direction may be horizontal directions.

The automatic transaction apparatus 100 depicted in FIG. 1 is, for example, an ATM, a bill recycle unit (BRU), a cash dispenser (CD), or a teller cash recycler (TCR) and includes a body unit 110, an intermediate conveyance section 120, and a storage unit 130. As an example, the body unit 110 and the storage unit 130 may be disposed within different spaces with a partition (not illustrated) therebetween, and the intermediate conveyance section 120 may convey a banknote B (see FIG. 2A) through the partition. Note that the banknote B is an example of a paper sheet.

The body unit 110 includes a banknote insertion/withdrawal unit 1, conveyance sections 111 and 113, a validation unit 112, a temporary retention section 114, and a reject unit 115.

Figure 3A:
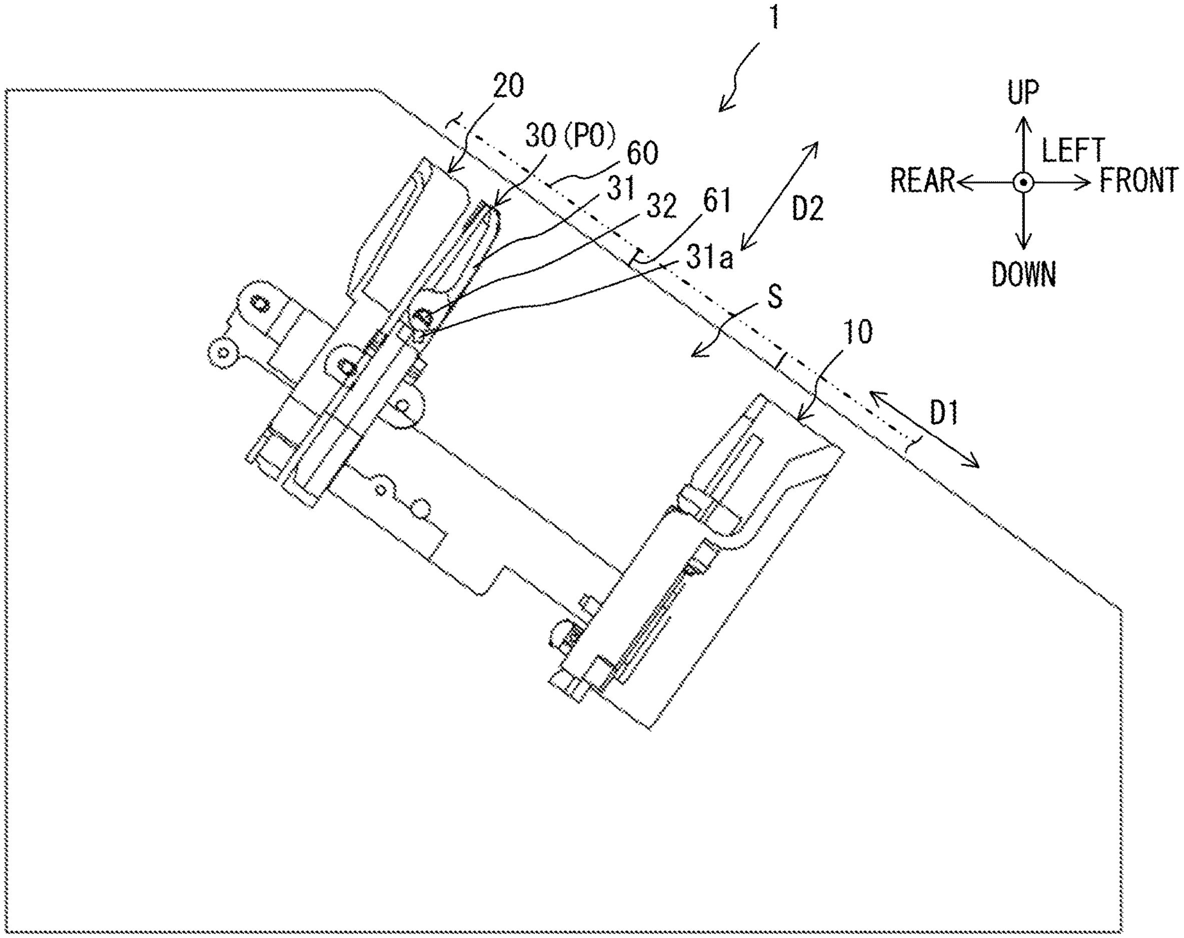
FIG. 3A is an explanatory diagram for illustrating a money inserting operation performed by a banknote insertion/withdrawal unit in an embodiment (example 1)
Figure 3B:
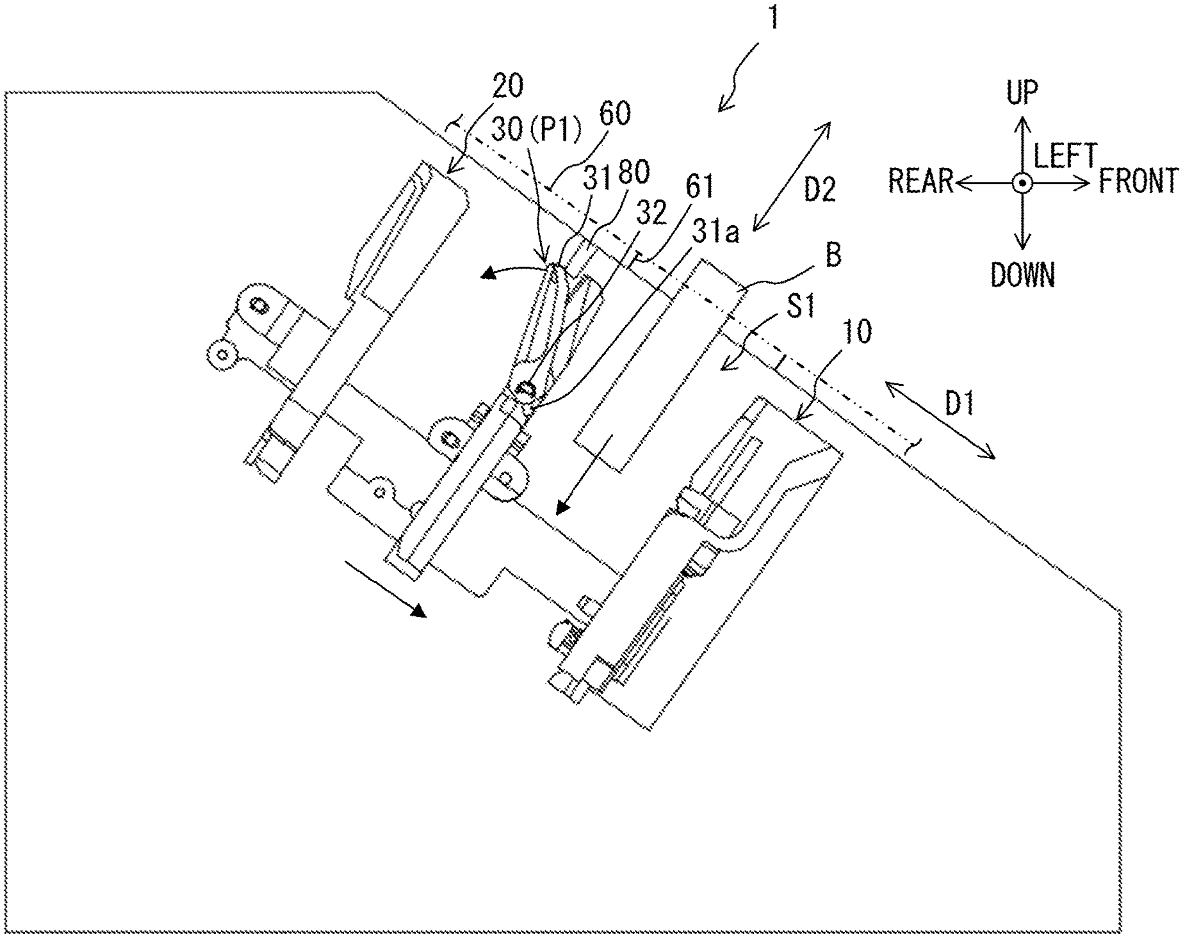
FIG. 3B is an explanatory diagram for illustrating a money inserting operation performed by a banknote insertion/withdrawal unit in an embodiment (example 2)

The banknote insertion/withdrawal unit 1 includes a stage 10, a roof 20, a pusher 30, a take-in conveyance section 40, a discharge conveyance section 50, a front face panel 60, a shutter 70, and a first contact section 80 (see FIG. 3B). Note that the banknote insertion/withdrawal unit 1 alone can also be considered to be an example of a paper sheet handling apparatus.

The stage 10, the roof 20, the pusher 30, and the first contact section 80 will be described hereinafter by referring to FIGS. 3A-3C, 4A, and 4B.

The take-in conveyance section 40 conveys a banknote B inserted between the stage 10 and the pusher 30 so as to take the same into the automatic transaction apparatus 100.

The discharge conveyance section 50 discharges a banknote B to the space between the roof 20 and the pusher 30.

The front face panel 60 is disposed on an upper front face of the automatic transaction apparatus 100 so as to be inclined in the vertical direction and the horizontal direction, such that portions of the front face panel 60 at a higher position are located at a more rearward position. The front face panel 60 is provided with an insertion/take-out port 61.

The shutter 70 blocks the insertion/take-out port 61 in an openable manner. FIG. 1 depicts, by using a solid line, the shutter 70 with an open state attained, and depicts, by using a dotted line, the shutter 70 with a closed state attained.

The conveyance section 111 transports a banknote B from the banknote insertion/withdrawal unit 1 to the validation unit 112, and transports a banknote B from the validation unit 112 to the intermediate conveyance section 120, or vice versa.

The validation unit 112 determines a banknote B for, for example, authenticity, dirt, and/or corner folding.

The conveyance section 113 transports a banknote B from the validation unit 112 to the temporary retention section 114, or vice versa, and transports a banknote B from the validation unit 112 to the banknote insertion/withdrawal unit 1.

The temporary retention section 114 temporarily stores a banknote B inserted into the banknote insertion/withdrawal unit 1 and determined as being normal by the validation unit 112.

The reject unit 115 stores banknotes B not to be returned, among banknotes B determined as being abnormal by the validation unit 112.

The intermediate conveyance section 120 transports a banknote B from the body unit 110 to the storage unit 130, or vice versa.

The storage unit 130 is disposed below the body unit 110 and includes a plurality of banknote storage cassettes 131, 132, 133, 134, and 135 and a storage conveyance section 136.

For example, the plurality of banknote storage cassettes 131-135 may each store banknotes B of a different denomination. The banknote storage cassettes 131-135 can send out stored banknotes B. Thus, banknotes B stored in the banknote storage cassettes 131-135 are used for withdrawal.

The storage conveyance section 136 conveys a banknote B from the intermediate conveyance section 120 to each of the banknote storage cassettes 131-135, or vice versa.

Figure 2A:
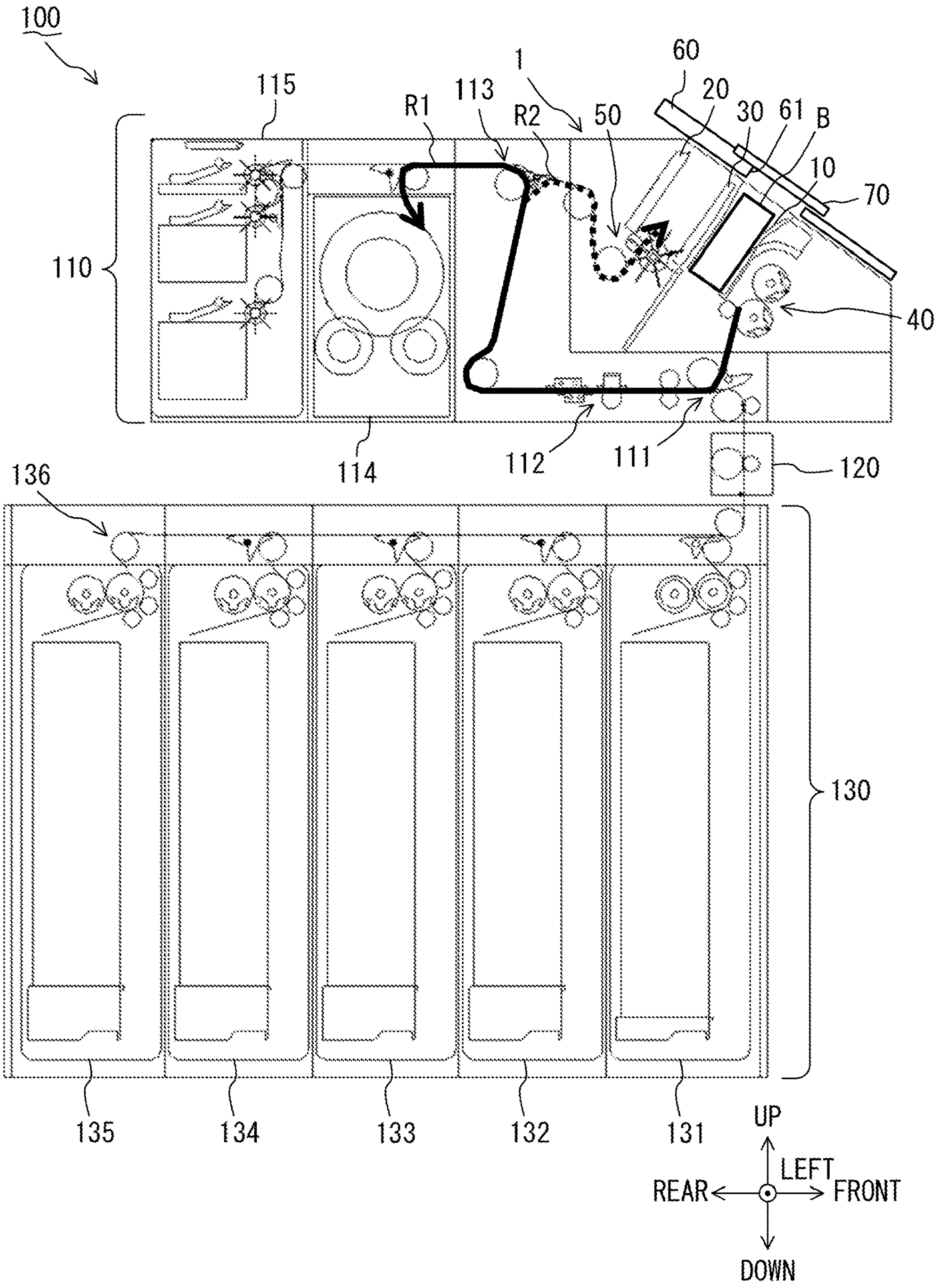
FIG. 2A is an explanatory diagram for illustrating transporting routes for banknotes within an automatic transaction apparatus in an embodiment (example 1)
Figure 2B:
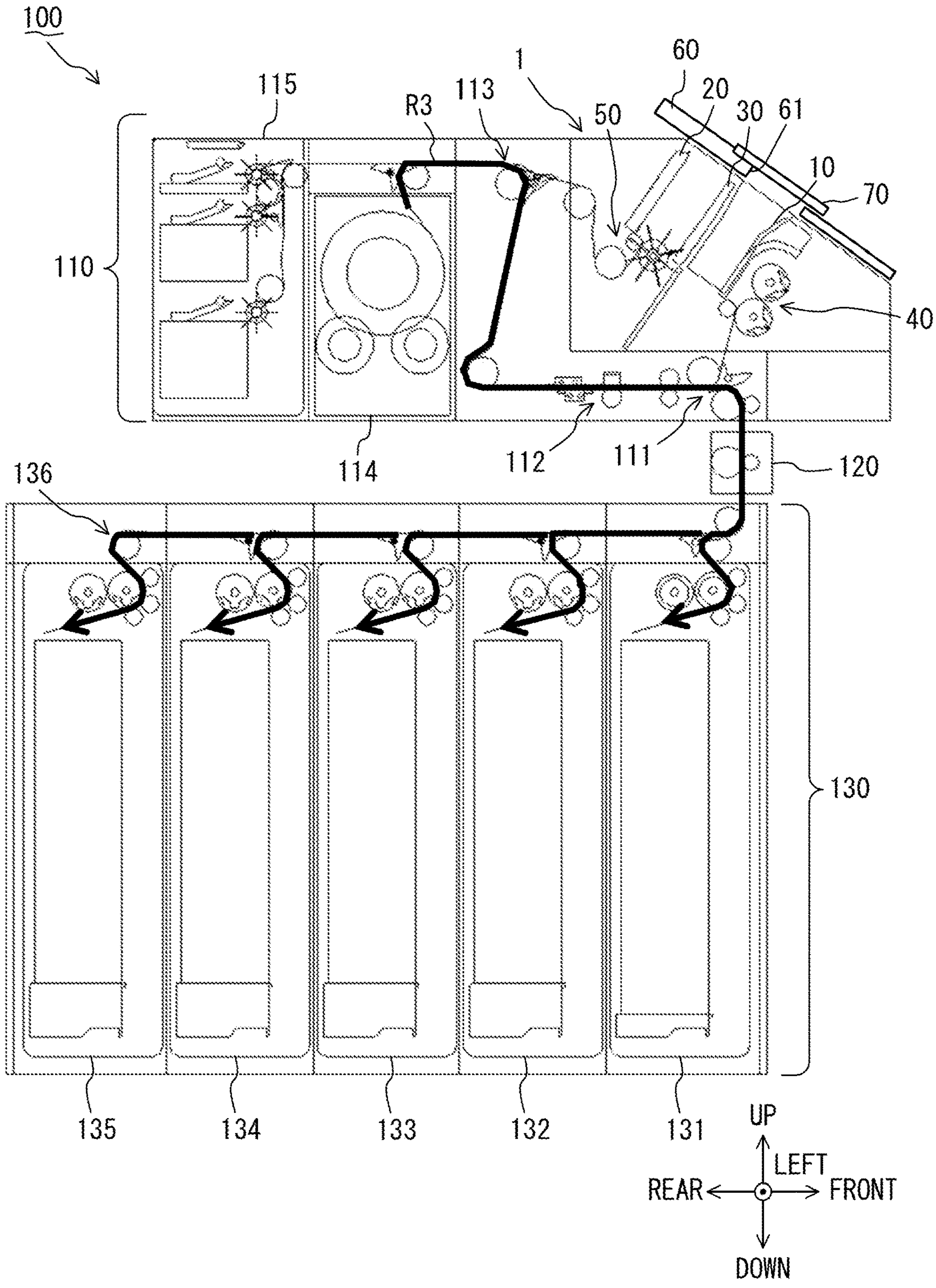
FIG. 2B is an explanatory diagram for illustrating a transporting route for banknotes within an automatic transaction apparatus in an embodiment (example 2)
Figure 2C:
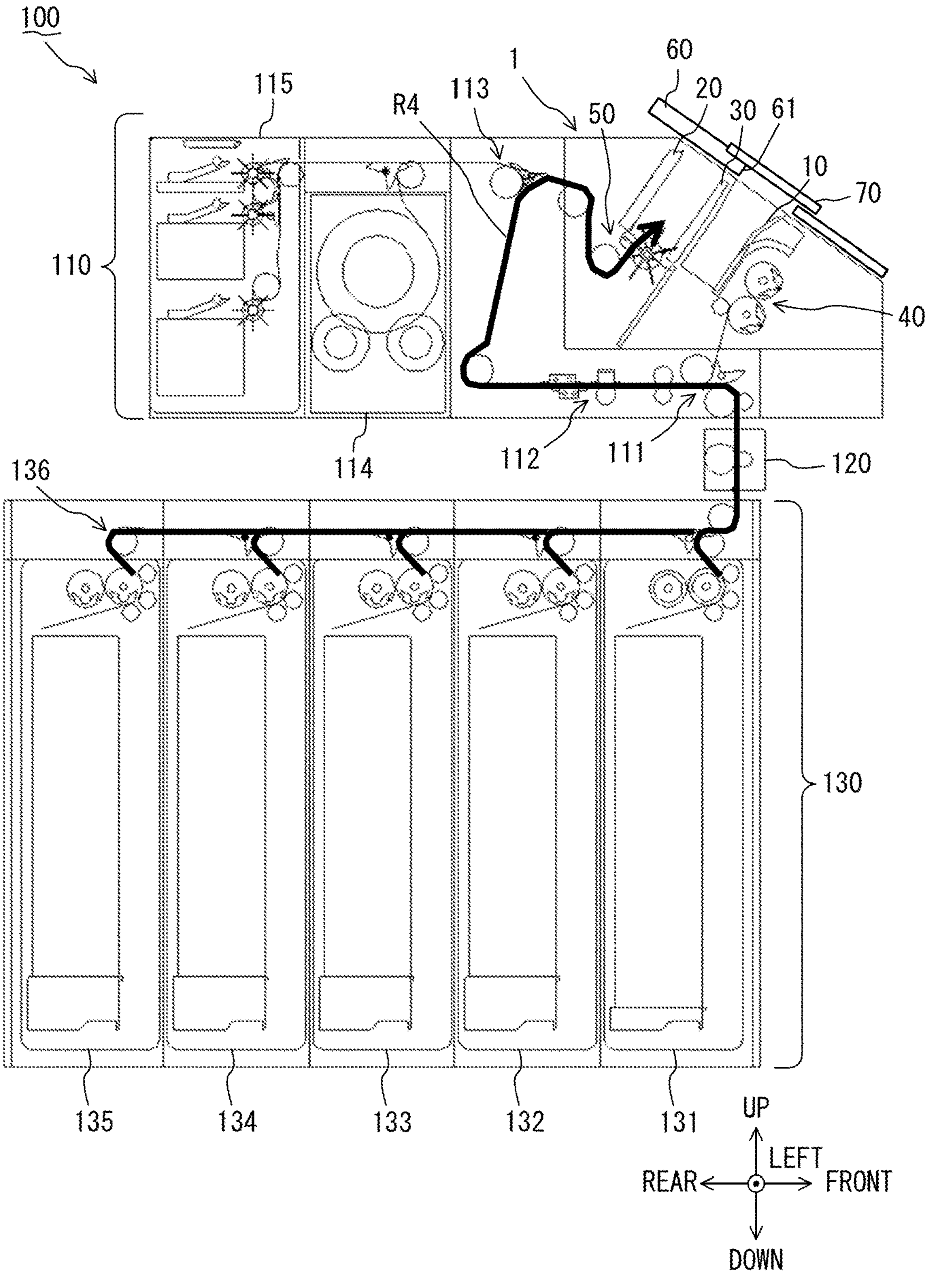
FIG. 2C is an explanatory diagram for illustrating a transporting route for banknotes within an automatic transaction apparatus in an embodiment (example 3)

FIGS. 2A-2C are explanatory diagrams for illustrating transporting routes R1-R4 for banknotes B within the automatic transaction apparatus 100.

First, as indicated by the transporting route R1, which is indicated by a thick solid arrow in FIG. 2A, a banknote B inserted into the banknote insertion/withdrawal unit 1 is transported to the validation unit 112 by the take-in conveyance section 40 and the conveyance section 111. A banknote B determined as being normal by the validation unit 112 is conveyed to the temporary retention section 114 by the conveyance section 113.

Meanwhile, as indicated by the transporting route R2, which is indicated by a thick dotted arrow in FIG. 2A, a banknote B determined as being abnormal by the validation unit 112 (e.g., false banknote) is returned to the banknote insertion/withdrawal unit 1 by the conveyance section 113 and the discharge conveyance section 50.

As indicated by the transporting route R3, which is indicated by a thick solid arrow in FIG. 2B, banknotes B temporarily stored in the temporary retention section 114 are conveyed to the banknote storage cassettes 131-135 by the conveyance section 113, the validation unit 112, the conveyance section 111, the intermediate conveyance section 120, and the storage conveyance section 136.

As indicated by the transporting route R4, which is indicated by a thick solid arrow in FIG. 2C, banknotes B stored in the banknote storage cassettes 131-135 are sent out, at the time of withdrawal, to the banknote insertion/withdrawal unit 1 by the storage conveyance section 136, the intermediate conveyance section 120, the conveyance section 111, the validation unit 112, the conveyance section 113, and the discharge conveyance section 50.

Next, descriptions are given of a money inserting operation and a money withdrawing operation performed by the banknote insertion/withdrawal unit 1.

Figure 3C:
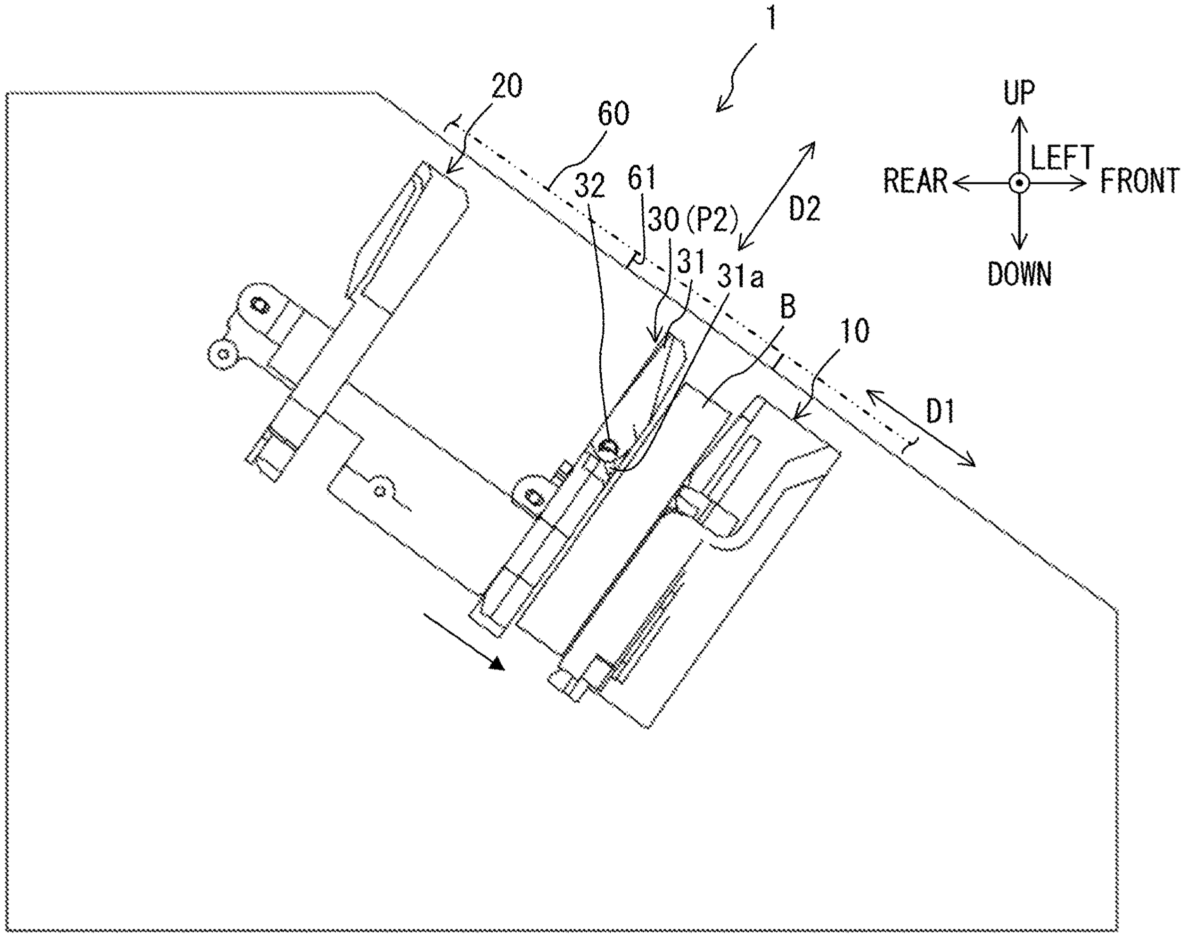
FIG. 3C is an explanatory diagram for illustrating a money inserting operation performed by a banknote insertion/withdrawal unit in an embodiment (example 3)

FIGS. 3A-3C are explanatory diagrams for illustrating the money inserting operation performed by the banknote insertion/withdrawal unit 1.

Figure 4A:
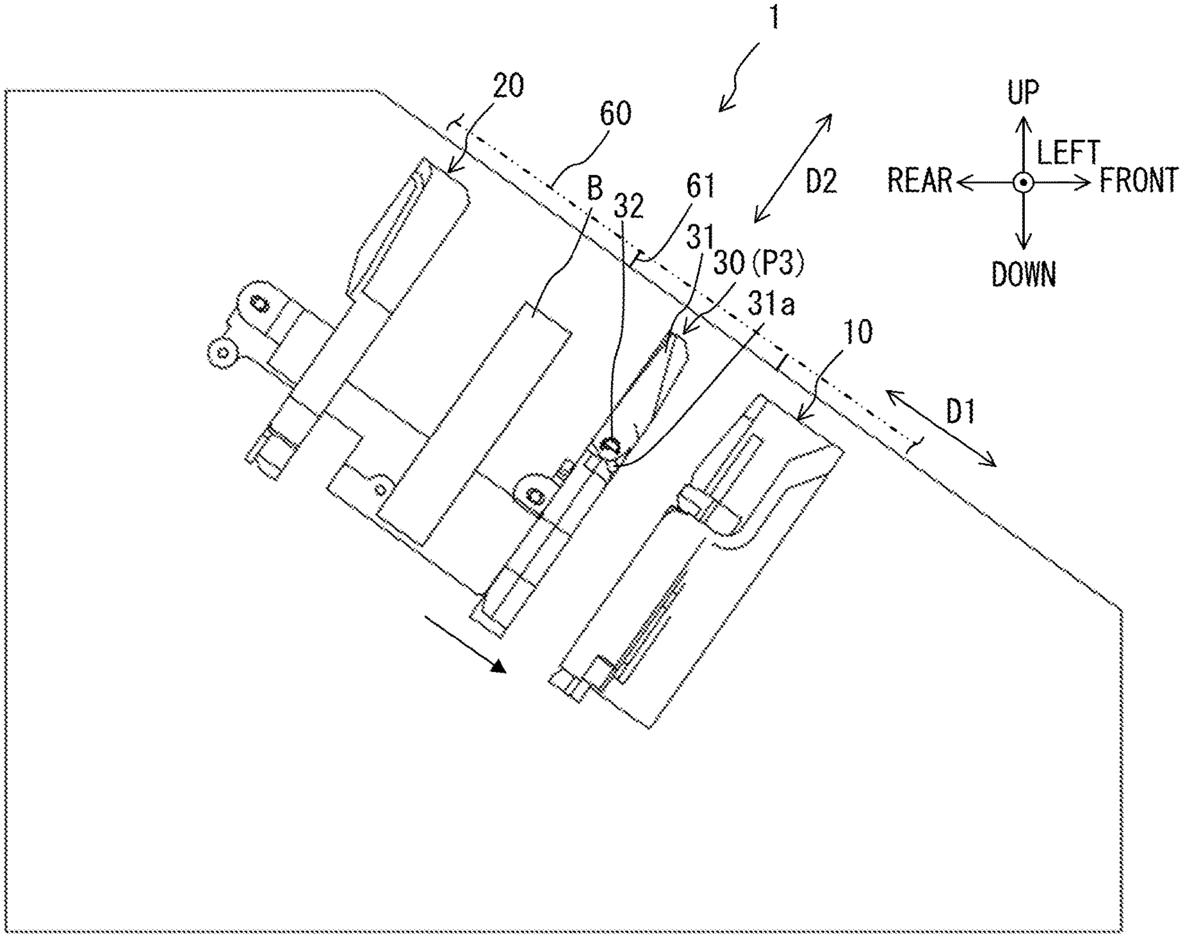
FIG. 4A is an explanatory diagram for illustrating a money withdrawing operation performed by a banknote insertion/withdrawal unit in an embodiment (example 1)
Figure 4B:
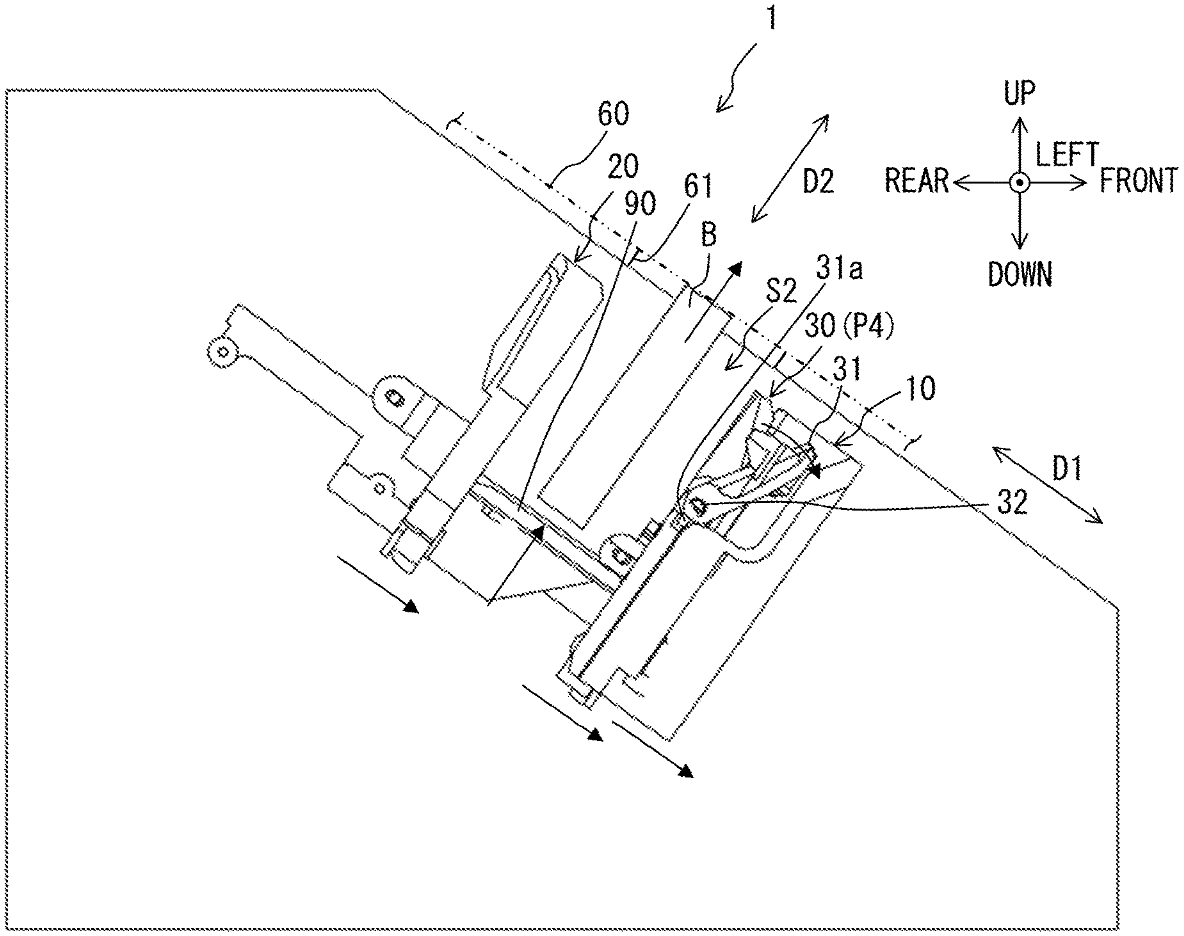
FIG. 4B is an explanatory diagram for illustrating a money withdrawing operation performed by a banknote insertion/withdrawal unit in an embodiment (example 2).

FIGS. 4A and 4B are explanatory diagrams for illustrating the banknote withdrawing operation performed by the banknote insertion/withdrawal unit 1.

First, descriptions are given of the configurations of the stage 10, the roof 20, the pusher 30, and the first contact section 80.

As depicted in FIG. 3A, the stage 10 and the roof 20 are disposed to face each other across an insertion/take-out space S. A banknote B is inserted through the insertion/take-out port 61 of the front face panel 60, which is indicated by a two-dot dash line in FIGS. 3A-4B, into the insertion/take-out space S. A banknote B is also taken out from the insertion/take-out space S through the insertion/take-out port 61.

The stage 10 and the roof 20 are disposed to be inclined in the vertical direction and the horizontal direction so as to be parallel to an insertion/take-out direction D2 in which a banknote B is inserted or taken out, such that portions of the stage 10 and the roof 20 at a more frontward position are located at a higher position. Thus, a facing direction D1 in which the stage 10 and the roof 20 face each other is orthogonal to the insertion/take-out direction D2, and inclined in the vertical direction and the horizontal direction such that portions at a more rearward position are located at a higher position.

The stage 10 and the roof 20 can move in the facing direction D1. Note that the stage 10 is an example of the first facing section, and the roof 20 is an example of the second facing section.

The pusher 30 is an example of the partition section disposed between the stage 10 and the roof 20 so as to be capable of moving in the facing direction D1 in which the stage 10 and the roof 20 face each other. As depicted in FIG. 3B, the pusher 30 forms, within the insertion/take-out space S, an insertion space S1 between the pusher 30 and the stage 10 into which a banknote B is inserted through the insertion/take-out port 61. As depicted in FIG. 4B, the pusher 30 forms a take-out space S2 between the pusher 30 and the roof 20 from which a banknote B is taken out through the insertion/take-out port 61.

The pusher 30 includes a movable member 31 provided at a leading end portion of the pusher 30 on the insertion/take-out port 61 side and capable of moving toward each of the stage 10 (see FIG. 4B) and the roof 20 (see FIG. 3B). For example, the movable member 31 may be provided only at a portion of the pusher 30 in the vicinity of the center in a left-right direction intersecting the facing direction D1 and the insertion/take-out direction D2.

The movable member 31 is supported to be capable of turning about a turn shaft 32. The movable member 31 may be biased by an elastic body such as a torsion spring so as to be kept positioned parallel to the stage 10 and the roof 20. A press-reception projection **31*a* protruding downward (toward the stage 10) is provided on a portion of the movable member 31 on the opposite side of the turn shaft 32 from the insertion/take-out port 61**.

As depicted in FIG. 3B, the first contact section 80 is a projection provided rearward of the insertion/take-out port 61 and protruding downward from the back side of the front face panel 60.

Next, descriptions are given of the flows of the money inserting operation and the banknote withdrawing operation performed by the banknote insertion/withdrawal unit 1.

Before a banknote B is inserted, as depicted in FIG. 3A, the pusher 30 is located at an initial position P0 and stays close to the roof 20.

At the time of insertion of a banknote B, as depicted in FIG. 3B, the pusher 30 is located at an insertion position P1 and forms the insertion space S1 between the pusher 30 and the stage 10. When the pusher 30 is located at the insertion position P1, the movable member 31 contacts the first contact section 80 and is pressed against the elastic force of the above-described elastic body, thereby moving to tilt toward the roof 20. Accordingly, the insertion space S1 (the space between the pusher 30 and the stage 10) becomes wider toward the insertion/take-out port 61, so that a customer can easily insert a banknote B. It should be noted that the movable member 31 may move to tilt toward the roof 20 by means of, for example, a driving force of a driving means (not illustrated).

After insertion of a banknote B is completed, as depicted in FIG. 3C, the pusher 30 moves toward the stage 10 and reaches a take-in position P2 at which the pusher 30 and the stage 10 sandwich the banknote B. Afterward, for example, the stage 10 and the pusher 30 may move forward and thus move obliquely downward, i.e., move toward the take-in conveyance section 40 depicted in FIG. 1, and the banknote B may be transported toward the conveyance section 111 by the take-in conveyance section 40, with, for example, a pick roller of the take-in conveyance section 40 protruding through an opening (not illustrated) provided in the stage 10.

At the time of withdrawal of banknotes B, as indicated in FIG. 4A, as many banknotes B as are scheduled to be sent out are transported to the space between the roof 20 and the pusher 30, which is located at a send-out position P3, by the discharge conveyance section 50 depicted in FIG. 1.

As depicted in FIG. 4B, the pusher 30 moves toward the stage 10 together with the roof 20. At the time of taking out a banknote B, the pusher 30 is located at a take-out position P4 and forms the take-out space S2 between the pusher 30 and the roof 20. When the pusher 30 is located at the take-out position P4, the press-reception projection **31*a* contacts the stage 10 and is pressed against the elastic force of the above-described elastic body, thereby causing the movable member 31 to move to tilt toward the stage 10. Accordingly, the take-out space S2 (the space between the pusher 30 and the roof 20) becomes wider toward the insertion/take-out port 61, so that a customer can easily take out the banknote B. In this case, the stage 10 functions as an example of a second contact section that contacts the movable member 31 so as to move the movable member 31 toward the stage 10**.

It should be noted that, as described above, the movable member 31 may move to tilt toward the stage 10 by means of, for example, a driving force of the driving means (not illustrated). The movable member 31 may also contact a second contact section other than the stage 10, so as to move to tilt toward the stage 10. A portion of the movable member 31 other than the press-reception projection **31*a* may contact the stage 10** (second contact section).

Afterward, a supporting section 90 that is disposed to face the insertion/take-out port 61 and supports the banknote B moves toward the insertion/take-out port 61. Then, the customer takes out the banknote B.

In the present embodiment, which has been described so far, the automatic transaction apparatus 100, i.e., an example of the paper sheet handling apparatus, includes: the stage 10, i.e., an example of the first facing section; the roof 20, i.e., an example of the second facing section; and the pusher 30, i.e., an example of the partition section. The stage 10 and the roof 20 are disposed to face each other across the insertion/take-out space S into which a banknote B, i.e., an example of a paper sheet, is inserted through the insertion/take-out port 61 and from which a banknote B is taken out through the insertion/take-out port 61. The pusher 30 is disposed between the stage 10 and the roof 20 so as to be capable of moving in the facing direction D1 in which the stage 10 and the roof 20 face each other. The pusher 30 forms, within the insertion/take-out space S, the insertion space S1 between the pusher 30 and the stage 10 into which a banknote B is inserted through the insertion/take-out port 61, and forms, within the insertion/take-out space S, the take-out space S2 between the pusher 30 and the roof 20 from which a banknote B is taken out through the insertion/take-out port 61. The pusher 30 includes the movable member 31 provided at a leading end portion of the pusher 30 on the insertion/take-out port 61 side and capable of moving toward each of the stage 10 and the roof 20.

Accordingly, the movable member 31 can move toward the roof 20 so as to make the insertion space S1 between the stage 10 and the pusher 30 wider toward the insertion/take-out port 61, so that a customer can easily insert a banknote B. The movable member 31 can also move toward the stage 10 so as to make the take-out space S2 between the roof 20 and the pusher 30 wider toward the insertion/take-out port 61, so that a customer can easily take out a banknote B.

In the meantime, in order to allow the insertion space S1 and the take-out space S2 to be wider toward the insertion/take-out port 61, the pusher 30 may have a tapered shape such that the thickness thereof in the facing direction D1 decreases toward the insertion/take-out port 61 (comparative example). In the comparative example, due to the pusher 30 being thick, the insertion amount and the take-out amount of banknotes B decrease, or the insertion/take-out space S is large-sized. In the present embodiment, by contrast, since the movable member 31 moves toward each of the stage 10 and the roof 20 as described above, the insertion space S1 and the take-out space S2 can be made wider toward the insertion/take-out port 61 without the pusher 30 having a tapered shape.

Accordingly, the present embodiment can allow a banknote B (paper sheet) to be easily inserted or taken out, and increase the insertion amount and the take-out amount of banknotes B with the simple configuration.

In the present embodiment, at the time of insertion of a banknote B, the movable member 31 moves toward the roof 20, with the pusher 30 being located at the insertion position P1 at which the pusher 30 forms the insertion space S1 between the pusher 30 and the stage 10; and, at the time of taking out a banknote B, the movable member 31 moves toward the stage 10, with the pusher 30 being located at the take-out position P4 at which the pusher 30 forms the take-out space S2 between the pusher 30 and the roof 20.

Accordingly, when the pusher 30 is located at the insertion position P1, the movable member 31 can make the insertion space S1 wider toward the insertion/take-out port 61 by moving toward the roof 20. When the pusher 30 is located at the take-out position P4, the movable member 31 can make the take-out space S2 wider toward the insertion/take-out port 61 by moving toward the stage 10. Hence, a banknote B can be easily inserted or taken out.

In the present embodiment, the automatic transaction apparatus 100 includes: the first contact section 80 that contacts the movable member 31 so as to move the movable member 31 toward the roof 20 when the pusher 30 is located at the insertion position P1; and the stage 10, i.e., an example of the second contact section, that contacts the movable member 31 so as to move the movable member 31 toward the stage 10 when the pusher 30 is located at the take-out position P4.

Accordingly, the disposing of the driving means for moving the movable member 31 can be omitted. Hence, the configuration of the banknote insertion/withdrawal unit 1 can be made simpler.

The present invention is not simply limited to the embodiments described above. Components of the embodiments may be embodied in a varied manner. For example, a plurality of components disclosed with reference to the embodiments may be combined, as appropriate, to achieve various inventions. Accordingly, various variations and applications of the invention can be provided without departing from the gist of the invention.

The invention claimed is:

1. A paper sheet handling apparatus comprising:

first and second facing sections that are disposed to face each other across an insertion/take-out space into which a paper sheet is inserted through an insertion/take-out port and from which a paper sheet is taken out through the insertion/take-out port; and a partition section that is disposed between the first and second facing sections so as to be capable of moving in a facing direction in which the first and second facing sections face each other, forms, within the insertion/take-out space, an insertion space between the partition section and the first facing section into which a paper sheet is inserted through the insertion/take-out port, and forms, within the insertion/take-out space, a take-out space between the partition section and the second facing section from which a paper sheet is taken out through the insertion/take-out port, wherein the partition section includes a movable member provided at a leading end portion of the partition section on an insertion/take-out port side and capable of moving toward each of the first facing section and the second facing section, at a time of insertion of a paper sheet, the movable member moves toward the second facing section, with the partition section being located at an insertion position at which the partition section forms the insertion space between the partition section and the first facing section, and at a time of taking out a paper sheet, the movable member moves toward the first facing section, with the partition section being located at a take-out position at which the partition section forms the take-out space between the partition section and the second facing section, and the paper sheet handling apparatus further comprises:

a first contact section that contacts the movable member so as to move the movable member toward the second facing section when the partition section is located at the insertion position; and a second contact section that contacts the movable member so as to move the movable member toward the first facing section when the partition section is located at the take-out position.

* * * * *